July 7, 1953     E. V. HARDWAY, JR     2,644,901
ELECTROKINETIC ANGULAR ACCELEROMETER
Filed Nov. 27, 1951

INVENTOR
EDWARD J. HARDWAY, JR.

BY Stone, Boyden & Mack.
ATTORNEYS

Patented July 7, 1953

2,644,901

UNITED STATES PATENT OFFICE 2,644,901

ELECTROKINETIC ANGULAR ACCELEROMETER

Edward V. Hardway, Jr., Richmond, Va.

Application November 27, 1951, Serial No. 258,491

9 Claims. (Cl. 310—2)

This invention relates to accelerometers and particularly to angular accelerometers comprising an electrokinetic transducer.

The invention provides a means for measuring both steady state angular acceleration and alternating angular acceleration over a wide frequency range. Accelerometers constructed in accordance with the invention are insensitive to pressure, linear acceleration and angular acceleration components about any axis other than that of the instrument.

My invention is based upon the phenomenon of electrokinetic conversion of pressure into electrical energy and employs an electrokinetic transducer of the general type disclosed in my copending applications, Serial Numbers 258,490, 258,492 and 258,493, filed even date herewith.

In order that the invention may be understood in detail reference is had to the accompanying drawings, which form a part of this specification, and wherein.

Figures 1, 2:
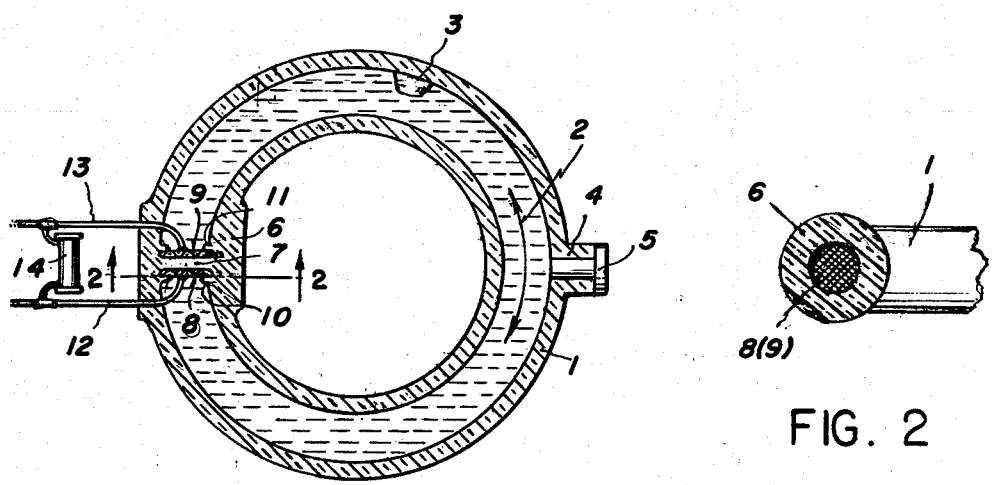
Fig. 1 is a sectional plan view of an angular accelerometer constructed in accordance with the invention.
Fig. 2 is a detail sectional view taken on the line 2—2, Fig. 1.

The embodiment of the invention illustrated in Figs. 1 and 2 comprises a toroidal enclosure or casing 1 presenting a closed liquid path 2. The casing 1 is of Pyrex glass or like inorganic insulating material, and is filled entirely with a suitable electrokinetic liquid, such as acetonitrile, except for a bubble 3 of air or inert gas to compensate for the differences in thermal expansion of the casing and liquid. Filling may be accomplished through an opening 4 closed after filling by an inert plug 5 sealed in place with a microcrystalline hydrocarbon wax.

A portion of the toroid 1 consists of a ring 6. Sealed within the ring 6 so as to close the entire bore thereof is a porous plug 7. The plug 7 preferably comprises a microporous fritted glass disk, and is preferably sealed in place by having its entire periphery fused directly to the inner wall of the ring 6. Disposed within the ring 6, and thus within the closed path provided by the casing 1 are electrodes 8 and 9 located one on each side of plug 7, as shown. The electrodes 8 and 9 are preferably of permeable sheet form, as disclosed in my copending application, Serial Number 258,492, and are located in intimate contact with the respective faces of the plug 7. For example, the electrodes 8 and 9 may be discs of fine mesh aluminum wire fabric coextensive with the faces of the plug 7 and held in place thereagainst by annular shoulders 10 and 11. Leads 12 and 13, passing through the wall of the enclosure 1 and sealed thereto, are connected to the electrodes 8 and 9, respectively, so that a suitable electroresponsive device may be connected across the electrodes. As explained in my copending application, Serial Number 258,493, the electrokinetic characteristic of the liquid employed will usually vary with temperature, and compensation for such variation may be provided by connecting a thermally responsive resistance 14 across the electrodes.

Figures 3, 4:
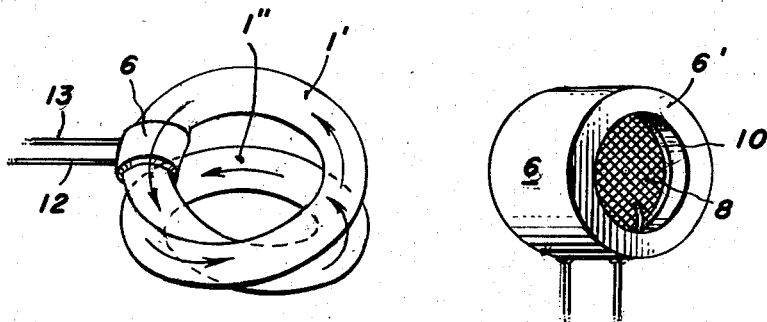
Fig. 3 is a perspective view showing a portion of the device shown in Fig. 1.
Fig. 4 is a perspective view of another embodiment of the invention.

A unit, as shown in Fig. 3, comprising the ring 6, the disc 7, and the electrodes 8 and 9 may first be fabricated separately, and the end faces 6' of the ring 6 may then be fused to the ends of a toroid incomplete by the length of the ring to complete the assembly shown in Fig. 1.

In operation, angular acceleration of the enclosure 1 causes a corresponding flow of liquid therein, resulting in a flow of liquid in one direction through the plug 7. The pores of the plug 7 may be considered as minute capillaries. The molecules of the electrokinetic liquid are electrostatically unbalanced, having finite dipole moments, and therefore assume preferred orientations at the interface between the liquid and the surfaces of the capillaries. Thus, the liquid at the center of each capillary or pore becomes oppositely charged relative to the liquid layer at the interface. When the liquid moves through the plug 7 under an applied pressure resulting from an angular acceleration of the casing 1 about its axis, a volume current of charged liquid flows through the plug 7, establishing a potential difference across the electrodes 8 and 9 measurable by a suitable electroresponsive instrument connected across the leads 12 and 13. A countercurrent is present because of the conductivity of the electrokinetic liquid, and this countercurrent limits the potential difference to a definite value proportional to the applied pressure.

If the mean radius from the center of the toroid 1 to the center of the liquid path 2 is $x$, then the pressure across the porous plug 7 is $2\pi h x^2 a$, where $h$ is the density of the electrokinetic liquid and $a$ is the angular acceleration around the axis of the toroid.

Where especially great sensitivity is desired, the enclosure may be in the form of a multiturn helix with joined ends, as seen in Fig. 4. Here, the structure of the ring 6, containing the porous plug and the electrodes, remains the same, but the casing or enclosure includes two turns 1' and 1'' joined to form a closed liquid path. As indicated by the arrows, such a closed path provides for continuous liquid flow in one direction.

While toroidal and helical closed paths have been illustrated, less regular closed paths may be employed, just so long as the path is such that angular acceleration about the instrument axis results in an adequate pressure differential across the porous plug.

Figure 5:
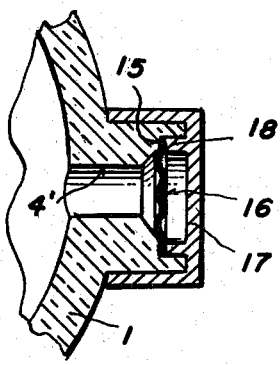
Fig. 5 is a detail sectional view of a sealing plug which may be used in accordance with the invention.

The bubble 3, Fig. 1, is shown primarily to illustrate the necessity for some means to compensate for the difference in thermal expansion between the casing and the liquid with which the casing is filled. Otherwise, such difference in thermal expansion may cause sufficient internal pressure to burst the casing. In actual practice, it is usually desirable to maintain in the enclosure or casing an unbroken body of liquid which completely fills the casing. Therefore, it is usually desirable to use in place of the bubble 3 a flexible bulb or diaphragm which may be displaced by excessive internal pressure. One suitable structure is shown in Fig. 5, where the filling opening 4' corresponds to the opening 4 of Fig. 1. The opening 4' is provided with an outer enlarged portion including a transverse shoulder 15 facing the outer end of the opening. Seated against the shoulder 15 is a flexible metal diaphragm 16 and the opening is closed by an end cap 17 having an internal annular projection 18 bearing against the diaphragm 16 to hold the same in place. To avoid contamination, the surface of the diaphragm 16 facing the interior of the enclosure may be an aluminum overlay and all joints of the closure may be sealed with microcrystalline hydrocarbon wax. Internal pressures force the diaphragm 16 to flex toward the end cap 17, the space between the diaphragm and the end cap being merely an air pocket, and bursting pressures are thus relieved.

It will be noted that a particular inherent advantage of the present form of electrokinetic instrument is that there is no need to provide means for establishing a proportional restoring force on the electrokinetic liquid in opposition to the applied pressure, such a force ordinarily being required as described in my copending application Serial Number 258,493. In the instrument of the present invention, the electrokinetic liquid may flow continuously in one direction under pressure of steady state angular acceleration, the flow being resisted only by the porous plug. Or, if the angular motion of the casing about its axis is alternating, the liquid will of course automatically reverse its flow with each alternation of the casing movement.

While the casing 1 has been described as being entirely of an inert electrical insulating material such as glass, it is not necessary that the entire enclosure be of insulating material. The ring 6 may be of insulating material, and the remainder of the toroid, helix or other closed casing may be of metal. Thus, all of the toroid 1 of Fig. 1, except for the ring 6, may be of aluminum or other metal inert to the electrokinetic liquid employed. In this case, each end of the ring 6 may be provided with an outer annular flange, the ends of the tube may be flanged outwardly, and the matching flanges clamped together with a sealing gasket between adjacent flanges. When an aluminum or like conductive casing is used, a slight loss of sensitivity will result from thus short circuiting a portion of the liquid path.

I claim:

1. In an angular accelerometer, the combination of a sealed enclosure providing a closed liquid path, a porous plug disposed transversely within said enclosure and forming a porous dam across the interior thereof, said enclosure being filled with an electrokinetic liquid, and electrodes disposed within said enclosure one on each side of said plug and adjacent thereto.

2. In an angular accelerometer, the combination of a sealed enclosure providing a closed liquid path, a porous plug disposed transversely within said enclosure to form a porous dam across said path, said enclosure being filled with an electrokinetic liquid, and electrodes disposed within said enclosure one in contact with each face of said plug.

3. In an angular accelerometer, the combination of a tubular enclosure providing a closed liquid path, a porous plug disposed within said tubular enclosure and closing the entire bore thereof, said enclosure being filled with an electrokinetic liquid, and electrodes disposed within said enclosure one on each side of said plug and adjacent thereto.

4. In an angular accelerometer, the combination of a sealed enclosure providing a closed liquid path, said enclosure being filled with an electrokinetic liquid and consisting of an inorganic material inert to said liquid, an inorganic porous plug disposed within said enclosure and fused at its periphery to said enclosure to form a porous dam across said path, and electrodes disposed within said enclosure one on each side of said plug and adjacent thereto.

5. In an angular accelerometer, the combination of a toroidal enclosure, a porous disc sealed therein to provide a porous dam across the interior thereof, said enclosure being filled with an electrokinetic liquid, and electrodes disposed within said enclosure one on each side of said disc and adjacent thereto.

6. In an angular accelerometer, the combination of an insulating ring, a porous plug disposed within said ring and sealed about its periphery thereto, a tubular conduit having its ends sealed one to each end face of said ring to provide a continuous closed liquid path uninterrupted except by said plug, said path being filled with an electrokinetic liquid, and electrodes disposed in said path one adjacent each face of said plug.

7. In an angular accelerometer, the combination of a sealed enclosure providing a closed liquid path, a porous plug disposed transversely within said enclosure to form a porous dam across said path, said enclosure being filled with an electrokinetic liquid, electrodes disposed within said enclosure one on each side of said plug and adjacent thereto, a circuit for connecting an electroresponsive device across said electrodes, and a negative temperature coefficient resistor connected in said circuit across said electrodes.

8. In an angular accelerometer, the combination of an endless generally tubular sealed enclosure in the form of a multi-turn helix with joined ends, a porous plug disposed transversely within said enclosure and forming a porous dam across the interior thereof, and electrodes disposed within said enclosure one on each side of said plug and adjacent thereto, said enclosure being filled with an electrokinetic liquid.

9. In an angular accelerometer, the combination of a sealed enclosure providing an endless liquid path, a porous plug disposed transversely within said enclosure to provide a porous dam across said path, a pair of electrodes disposed within said enclosure and arranged one on each side of said plug and adjacent thereto, said enclosure being entirely filled with an unbroken body of electrokinetic liquid, and yieldable pressure relief means carried by said enclosure and in contact with said liquid to compensate for the difference in thermal expansion of said liquid and said enclosure.

EDWARD V. HARDWAY, Jr.

References Cited in the file of this patent

UNITED STATES PATENTS

| Number | Name | Date |
|---|---|---|
| 1,162,213 | Bloom | Nov. 30, 1915 |